BRINLEY & DODGE.
Plow.
No. 36,136.  Patented Aug 12, 1862.
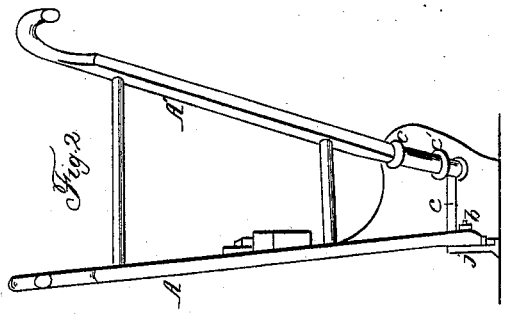
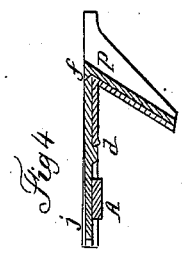
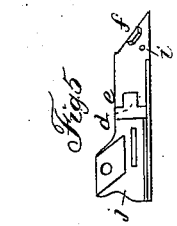
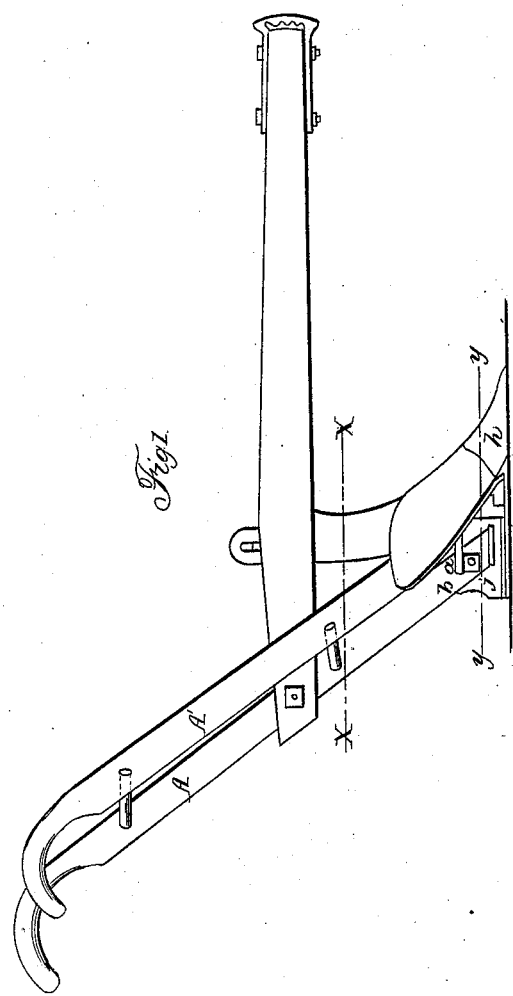
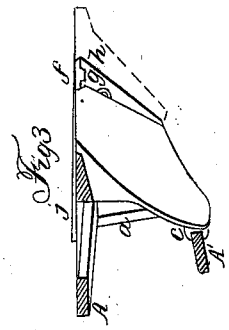
Witnesses;
G. A. C. Smith
Edw. J. Underwood
Inventors,
J. G. Dodge
J. E. C. Brinly
By J. G. Dodge his Atty

UNITED STATES PATENT OFFICE.

THOMAS E. C. BRINLY AND J. G. DODGE, OF LOUISVILLE, KENTUCKY.

IMPROVEMENT IN PLOWS.

Specification forming part of Letters Patent No. 36,136, dated August 12, 1862.

*To all whom it may concern:*

Be it known that we, THOS. E. C. BRINLY and J. G. DODGE, of Louisville, in the county of Jefferson and State of Kentucky, have invented certain new and useful Improvements in Plows; and we do hereby declare that the following is a full and exact description thereof, reference being had to the accompanying drawings, and the figures and letters of reference marked thereon, in which—

Figure 1 is a side elevation of the plow. Fig. 2 is a rear elevation of the plow. Fig. 3 is a section through the line $x\,x$ of Fig. 1. Fig. 4 is a section through the line $y\,y$ of Fig. 1. Fig. 5 is a side view of landside or bar.

Similar letters of reference indicate corresponding parts of the plow.

These inventions consist in a novel and new way of attaching a landside or bar to the short landside and mold-board, whereby a very firm and durable attachment is obtained, and one that will admit of the landside being readily detached, if broken, and a new one adjusted in its place, and of a novel and new way or adjustment of a brace round or rod, $a$, so as to make a firm and durable fastening of the handle A′ into the loops $c\,c$, and substantial brace between the mold-board and heel of the landside, so as to prevent them from collapsing by hard usage.

To enable others skilled in the art to make and use our invention, we will proceed to describe them.

Fig. 5 represents the landside of the plow, the hook $d$ of which hooks around or over the rear or hinder part of the short landside $e$, into an oblique groove in the same.

Letter $f$ is a projection at the front end of the landside which fits into a corresponding groove, $g$, in the mold-board.

Letter $i$ is a projection or pin on the landside, which fits into a corresponding hole in the short landside.

Letters $c\,c'$ are loops on the landside of or back of the mold-board, through which handle A′ passes, in Fig. 2.

Letter $a$ is a brace round or rod between the handles A A′ and through handle A′, just below the loop $c'$.

Having thus described our invention, what we claim as new, and desire to secure by Letters Patent, is—

1. The lock-joints, as shown in Fig. 5, shown by the letters $d$, $e$, $f$, and $g$, in connection.

2. The arrangement of the brace round or rod $a$, so it operates both as a brace and fastening of the handle A′ into the loops $c\,c$.

J. G. DODGE.
     T. E. C. BRINLY.

Witnesses to J. G. Dodge:
 THOMAS HAGERTY,
 EDWD. J. UNDERWOOD.

Witnesses to T. E. C. Brinly:
 E. C. BRALSON,
 I. EDWARD HARDY.